Figure 1:
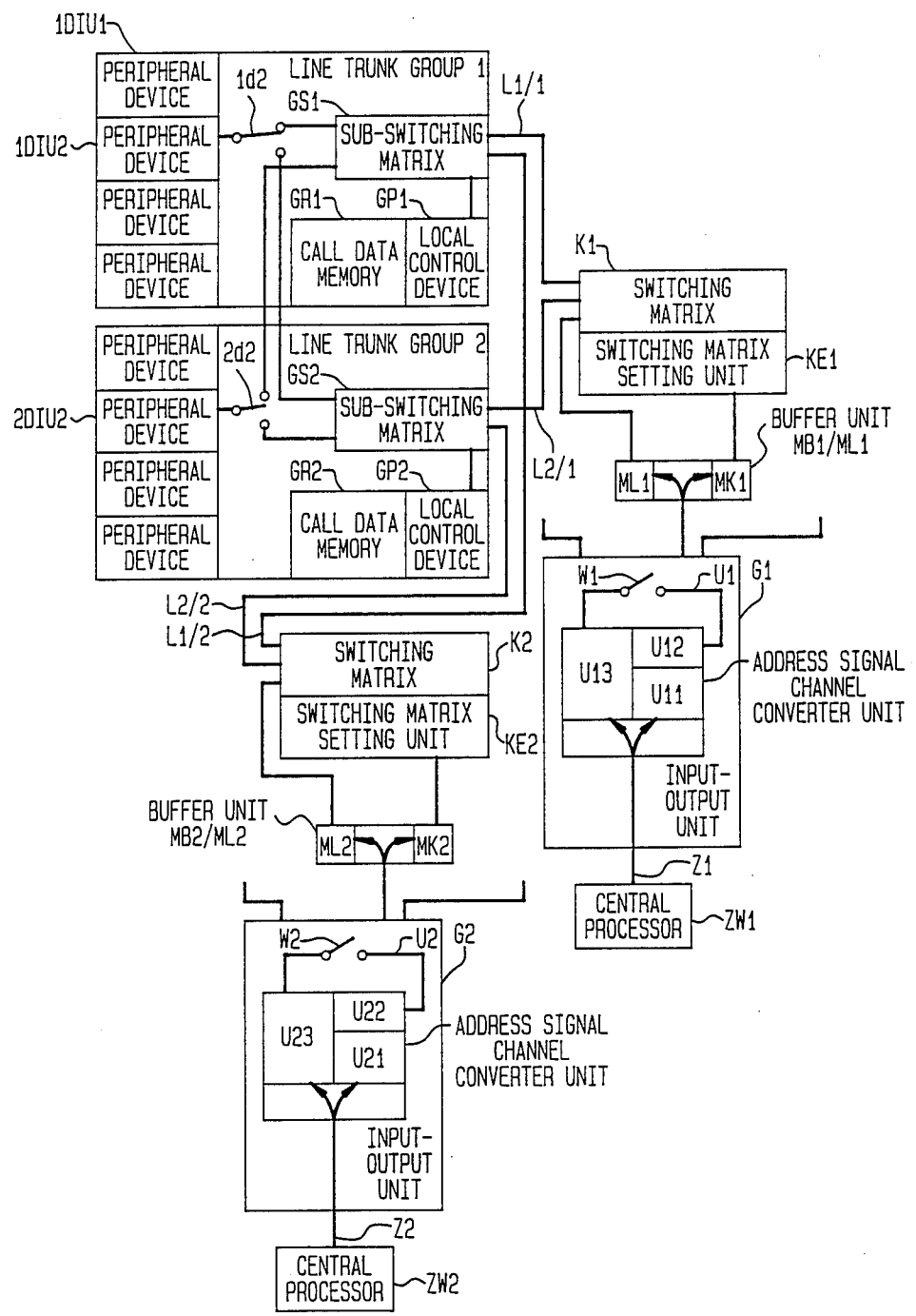

United States Patent [19]

Seeger et al.

[11] Patent Number: 4,853,957
[45] Date of Patent: Aug. 1, 1989

[54] TELECOMMUNICATION SWITCHING SYSTEMS WITH A CENTRAL SWITCHING AND LOCAL SUB-SWITCHING

[75] Inventors: Helmut Seeger, Wolfratshausen; Axel Leichum; Anthony Maher, both of Munich, all of Fed. Rep. of Germany

[73] Assignee: Siemens Aktiengesellschaft, Berlin and Munich, Fed. Rep. of Germany

[21] Appl. No.: 197,536

[22] Filed: May 23, 1988

[30] Foreign Application Priority Data

May 22, 1987 [DE] Fed. Rep. of Germany ....... 3717386

[51] Int. Cl.⁴ ............................................. H04M 3/00
[52] U.S. Cl. ...................................... 379/279; 370/16
[58] Field of Search ............... 379/279, 268, 269, 271, 379/273, 274; 370/16

[56] References Cited

U.S. PATENT DOCUMENTS 4,499,461 2/1985 Schneider ........................ 340/825.03
4,700,381 10/1987 Eher ..................................... 379/279

Primary Examiner—James L. Dwyer
Attorney, Agent, or Firm—Adel A. Ahmed

[57] ABSTRACT

A circuit arrangement, with a doubled central switching matrix to which two line trunk groups having a sub-switching matrix each and a group control unit each, are allocated to each other in pairs via two PCM-lines. The line facilities which are individually allocated to the one and the other of the two line trunk groups and which are connected to the sub-switching matrix of their own respective line trunk group during normal service, are switchable during emergency service of one of the two line trunk groups to the sub-switching matrix of the respective other line trunk group. In order that no interconnected calls are interrupted, each local control unit stores the call data of all interconnected calls during normal service. A prepared change-over signal blocks all call-establishing requests and implements the transmission of the call data to the respective associated line trunk group on the basis of which the appertaining calls are interconnected within the sub-switching matrix and respective associated line trunk group, and thus prepared for a change-over.

2 Claims, 2 Drawing Sheets

TELECOMMUNICATION SWITCHING SYSTEMS WITH A CENTRAL SWITCHING AND LOCAL SUB-SWITCHING

PCM-telephone switching systems are already known in the art, through the Journal ("telcom report") Vol. 4, 1981, Supplement "Digital Switching Systems EWSD", particularly through the article beginning on Page 19, which are equipped with a multi-stage central switching matrix, exhibiting time-division multiplex inputs and time-division multiplex outputs, and with a central processor, as well as with a number of line trunk groups serving the connection of time-division multiplex trunk lines each of which is connected to a time-division multiplex input and a time-division multiplex output of the switching matrix and each of which exhibits a multiplicity of line units, serving for the connection of a time-division multiplex trunk line, which themselves are connected to the time-division multiplex matrix unit belonging to the appertaining line trunk group and are connectable via these with channels of the corresponding time-division multiplex input and the corresponding time-division multiplex output of the switching matrix.

In telephone switching systems of this type, time-division multiplex trunk lines always include a large number, for example twenty four, thirty, sixty or even more channel pairs. A channel pair always encompasses a channel in the one transmission direction and a channel in the other transmission direction. One channel pair is required per connection (apart from so-called multichannel connections). As shown in the Figure of the noted Journal, a large number of line trunk groups per telephone switching center are provided with a double switching matrix for reasons of security. There are line units of various types depending on the specific type of the connected lines. Subscriber lines, as a rule, are analog lines but may also make use of PCM-technology. Trunk lines may likewise be analog lines. They may, however, also be in the form of PCM-channels which are combined with a time division multiplex line, respectively, in PCM-transmission systems in a manner understood in the art. The line trunk groups noted are established in various ways and respectively correspond to the appertaining technology of the subscriber and trunk lines to be connected, and depending on whether analog technology or time division multiplex technology is employed. As a rule, a line adapter is provided for a multiplicity, for example, eight, analog subscriber lines. Likewise, a line unit is provided for a multiplicity of analog trunk lines. As a rule, an individual line adapter is provided per time-division multiplex trunk line of a PCM-transmission system. It would likewise be possible however, to connect more than one time-division multiplex trunk line of a PCM-time division multiplex system to one line adapter, for example two time-division multiplex lines.

Through the natural combination of the number of channels noted in the above example, respectively, in a single PCM-transmission system, their allocation is of course conditioned to a single traffic route, for the appertaining channels must evidently run the same course as does the time-division multiplex line of this PCM-transmission system. Likewise, since on the basis of this combination, the connection of a time-division multiplex line of a PCM transmission system to a line unit of necessity requires the allocation of the appertaining channels to a single line unit and therefore to a single line trunk group, it follows that for the case where only the channels (channel pairs) of a single PCM-transmission system are prepared, that upon the failure of a line trunk group, all call capabilities in the appertaining traffic route will fail; thus in view of the switching system technology, an entire route destination cable.

In order to avoid the effect of total failure of a route destination cable explained above due to the failure of a line trunk group alone, provision is made, in cases understood in the art, for providing two independent PCM-transmission systems for traffic route and for connecting the time-division multiplex lines of these transmission systems to line units of two different line trunk groups. This is costly and un-economical particularly in the case of small trunk line routes because of the duplication of PCM-transmission systems.

In order not to have to provide a doubling of a PCM-transmission system per traffic route, in a circuit arrangement of the type noted in the preamble, in view of the possibility of a failure of a line trunk group and therefore avoid a situation in which an entire trunk line route, i.e. the channel pairs of the appertaining PCM-transmission system, may and/or must fail due to the failure of a line trunk group alone, it has already been proposed, that for telephone switching systems of the type known in the art and noted in the preamble, two line trunk groups be allocated to each other respectively, whereby further provision is made so that the line adapters of each of these two line trunk groups, which are connected to the time division multiplex matrix unit of their own line trunk group in normal service, and that one of the two line trunk groups be switchable to the time-division multiplex matrix of the respective other line trunk group during emergency service.

In the known case, this allows a PCM transmission system with its channels to remain in service upon the failure of the appertaining line trunk group. Thus, in this case, a double number of channels (channel pairs) is switched over a line trunk group, i.e of the respective other of the two line trunk groups allocated to each other in pairs. This leads to an especially great traffic related load of the appertaining line trunk group and an increase in trunk busy state cases, however all connections being established over the appertaining channels have an equal chance of being successful. It may also happen thereby that a multiplicity of traffic routes can only be operated at half traffic load. However, connections in all traffic routes can generally be established and, the total failure is avoided of the traffic route and/or traffic routes primarily affected.

The invention then relates to a circuit arrangement of similar type and in fact to a circuit arrangement for centrally controlled telecommunication switching systems, in particular to PCM-time-division-multiplex telephone switching systems in which a central switching matrix serving for call interconnections together with a central processor serving, among other functions, for its control, as well as for the required processing of switch identifiers is provided, and in which a multiplicity of local line trunk groups, each with a sub-switching matrix for the connection of external trunk and/or subscriber lines, and each with a local control unit are equipped for the reception of switch identifiers from these lines for switch identifier pre-processing as well as for switch identifier forwarding to the central processor, and for the transmission of switch identifiers over these lines, and in which sub-switching matrices in these line trunk groups are internally connected over groups of link lines, separated in groups, with switching matrix terminations of the central switching matrix, and in which the line trunk groups are allocated to each other in pairs, and in each of which line units, e.g. subscriber line circuits, multiple subscriber line circuits, trunk (-multiple-) termination circuits and the like, serving the connection to external subscriber and/or trunk lines are connected primarily with their sub-switching matrix are switchable in a manner through which the line circuits of a respective first of these two trunk line circuits are additionally switched to the sub-switching matrix of the respective other, thus a respective second line trunk group, whereupon the connections for the corresponding switch identifier processing as well as for the setting of the sub-switching matrix interconnected via the switched over line units are likewise executed by the local control unit of the other, thus second line trunk group.

In a circuit arrangement of this type there is the problem that, as a rule, a large number of connections exist, i.e. connections from subscriber station to subscriber station that have already been interconnected and that these connections will be interrupted. This is not only very disturbing to the appertaining subscribers, but also severely taxing to the operation of the switching centers, since all of the interrupted connections must be newly established. The disturbing effect for the appertaining subscribers lies not only in the unanticipated and abrupt interruption of the on-going telephone conversation but also in that, due to such an interruption, connections that have been established for data transmission purposes, control purposes, monitoring purposes and the like may also be affected. A following re-establishment of each of these interrupted connections means that the appertaining switching systems, particularly the data processing, as well as the communication interconnection controlling, central and sub-central processors will be subject to a sudden intermittent overload.

An object of the invention is to provide means, in a circuit arrangement of the previously noted type, so that existing connections are not interrupted due to a switch-over that has become necessary - whatever the grounds may be requiring it - and to make unnecessary the re-establishment of the same together with the indicated negative consequences that occur, not only in the appertaining switching center, but in all related switching centers affected in connection with such a switch-over.

The invention solves the problem posed in that a call data memory is allocated to each local control unit in which call data per interconnected call is stored, regarding which external sub-switching matrix interface is respectively connected with its like in the same line trunk group or in an another line trunk group, that on the basis of a switch-over pre-preparation identifier provided for one line trunk group pair and one line trunk group therein, the appertaining two local control units are blocked against the establishment of new call establishment requests, in particular that calls still in the process of being established are blocked as well as the local control unit of the first line trunk group that transmits the call data stored in its memory to the control unit of the second line trunk group, and that this in conjunction with the call data that are preferably buffered in the call memory of the second line trunk group establishes separate connections via the appertaining sub-switching matrix, the central switching matrix and the same, or another sub switching matrix, whereby these separate connections from such external sub-switching matrix terminations are connectable with those of the first line trunk group the through the switch-over.

Figure 2:
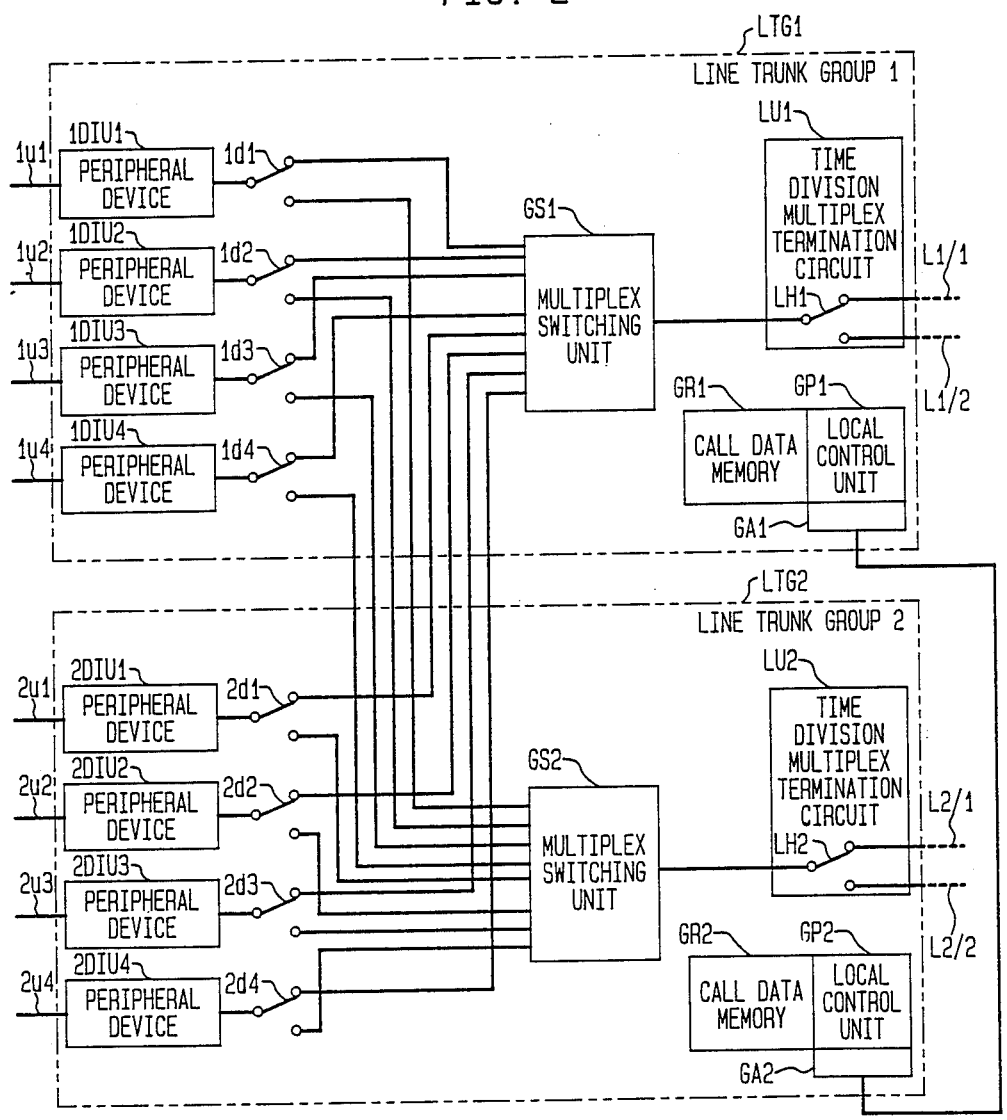

The drawings of FIG. 1 and FIG. 2 illustrate an embodiment of the invention showing only those components essentially contributing to its understanding but in no way limited to the same. Accordingly, FIG. 1 shows in essence a telephone system of the type described in German Patent No. 3 128 365 (VPA 81 P 6257).

FIG. 2 shows additional details significant to the invention.

Before the description touches upon the essential characteristic features of the embodiment, the operating mode of a modern telephone switching center in which the invention is applied will be explained. The starting point of the description will be the time division multiplex telephone switching system with PCM technology known in the art as it is described extensively and in detail in the technical literature, for example in the Journal "telcom report" mentioned further above. On Page 19ff therein are described peripheral line trunk groups which are a part of this telephone switching system. As likewise shown in FIG. 1 on Page 8 of this noted periodical, switching matrix (SN) and central processor (CP) are provided in duplicate, designated by "K1" and "K2" and by "ZW1" and "ZW2" in FIG. 1.

The drawing shows two line trunk groups LTG1 and LTG2 that are a part of a centrally controlled time division multiplex telephone switching system based on PCM technology according to FIG. 1. They are connected to the central and doubled switching matrix K1/K2 having time division multiplex inputs and time division multiplex outputs via time division multiplex lines L1/1, L2/1, and L1/2 and L2/2 according to FIG. 1 in a self evident manner. Thereby each of these connections corresponding to this doubling of the switching matrix is a duplicate of the other. Each of these two provided time division multiplex lines per line trunk circuit, for example LTG1, has a large number, thirty for example, of channels for each of the two transmission directions and is accordingly connected with each time division multiplex input as well as with each time division multiplex output of these two switching matrices, as is shown in detail and described in the Patent noted further above.

Furthermore as is shown in FIG. 1, a central Processor ZW1 and/or ZW2 is provided for each of the paralleled switching matrices K1/K2 with the aid of which the entire control activities for the establishment of connections via the respective central switching matrix K1 and/or K2 are accomplished in a manner known in the art through a buffer unit MB1/MK1 and/or MB2/MK2 and a switching matrix setting unit KE1 and/or KE2 as is separately described in the noted Patent. For this purpose data is retrieved from the line trunk groups, e.g. from the line trunk groups LTG1 and others, via the central processor ZW1 and/or ZW2, as well as directed to these in the opposite direction. At the same time local control units GP1, GP2 and similar others in the line trunk circuits cooperate in a manner understood in the art. The line trunk circuits and their integral line units are address selected for this data exchange.

Of the two central switching matrices K1 and K2 and the two central processors, one switching matrix, for example K1, and one central processor, for example ZW1, are respectively in service while the other switching matrix and the other processor are available in the event of a stand-by switch-over, if the need arises. Provisionally, in the interest of simplifying the further general description, discussion will be limited to the central switching matrix K1 and the central processor ZW1 only.

The data to be transmitted from the central processor ZW1 to the line trunk groups noted, which may also be retrieval instructions for the retrieval of data to be transmitted from the line trunk circuits and/or the line circuits to the central control unit, for example dialing data, is respectively prefixed with an appertaining line unit designated address. If but one line unit is to be selected from the central processor ZW1 for the transmission of data (retrieval instruction, if required) from the same to the former, it next transmits the address and the data in sequence to an input-output unit G1, (in "telecom report:" IOP). This unit then receives both and stores them.

As explained in the previously noted Patent, data connections exist via one channel per time division multiplex line between the input-output unit G1 on the one hand and each of the trunk line circuits and their local control units, for example GP1, GP2, on the other, via the time division multiplex lines L1/1 and/or L2/1 as well as via the switching matrix K1 and by way of buffer units MB1/ML1. If now, the input-output unit has received data along with an address from the central control unit ZW1 via the path z1, it directs a first element of the address to an address signal channel converter U1/U2. This first address element of the address corresponds to the respective line trunk circuit and therewith to its allocated data connection via buffer unit MB1 and switching matrix K1. The noted converter U11/U12 provides control data corresponding to the first part of the address which it sends to an electronic selector W1 which is set thereby to the appertaining signal channel (via the buffer MB1), the input-output unit G1 is thereby connected via the same to the local control unit, for example GP1, of the appertaining line trunk group, for example LTG1, and now transmits to the same the complete address, i.e. including the first address element.

A large number of line trunk groups serving as termination of time division multiplex trunk circuits allocated to different traffic routes are provided, of which the two line trunk groups LTG1 and LTG2 are shown in essence. Significant tasks and functions of these line trunk groups are described in great detail in the noted Journal and are assumed understood for the case at hand.

As is brought out further in the Journal noted, each of the line trunk groups respectively include a number of line units. These serve in a manner known in the art for the termination of subscriber circuits, trunk circuits or transmission systems with individually allocatable connecting channels. There are different types of line units, for example those for analog subscriber circuits, others for digital subscriber circuits, others for analog trunk circuits and the like. Likewise, there are line units which serve for the connection of a time-division multiplex trunk circuit, which as is known can encompass a large number, for example twenty or thirty, of individually allocatable PCM channels. Involved here, strictly speaking, is one channel pair per connection, whereby one channel respectively is provided for one transmission direction and the other for the other transmission direction.

In the Journal noted, the purpose which the indicated line units serve is described in detail. In the case of analog subscriber circuits and/or analog trunk circuits a line unit is provided for a multiplicity of lines. Line units for time division multiplex operated transmission systems that respectively encompass a larger number of channel pairs (see above) are so constructed that a transmission system with twenty-four or thirty channel pairs is connected. In the Journal noted there is further disclosed that in a line trunk circuit, which is arranged for time-division multiplex transmission systems, a total of four or five of such line units are provided. The Journal noted further indicates that within a single line trunk circuit, line units connected to a time division multiplex switching unit of the appertaining line trunk circuit are connectable via the same with channels of the corresponding time-division multiplex input of the appertaining line trunk circuit and the corresponding time division multiplex output of the central switching matrix.

One factor among others, in the case of this numerical allocation, is the concern that the traffic loads on the various sub-interfaces of the circuit paths are as well matched as possible. In practical terms, this means that the number of channel pairs which include all line units of time-division multiplex trunk circuits PCM transmission systems, to which each may be allocated a different traffic route, but which may also be allocated in two's or more, respectively, in common to one and the same traffic route is about equal to the number of channel pairs that time-division multiplex circuit encompasses which connects the appertaining line trunk circuit with the central switching matrix. Thus the transmission systems $1u1$ through $1u4$ in FIG. 2 may have about the same number of channel pairs as the time division multiple line L1/1.

Since it may happen that the local control devices (GP) or sub-switching matrices (GS) or time-division multiplex lines may be subject to failure which thus also applies to the time division multiplex lines L1/1, L1/2, L2/1 and L2/2, this would have the consequence that the time division multiplex transmission systems that are respectively connected to the appertaining line trunk circuit would likewise no longer be available for the establishment of a connection. Since switching technology systems using the above values and data related to the number of channel pairs per traffic route frequently need to provide only a single transmission system per transmission direction, the appertaining transmission system per traffic route would also fail during the failure of a local control device, a sub-switching matrix or a time division multiplex line connected with a central switching matrix and line trunk group. The same applies to a failure of the local control device, for example GP1 of a line trunk group, for example LTG1.

Such a possible disadvantage is ruled out by a means in which two line trunk groups are associated as pairs. What then applies to the two line trunk groups LTG1 and LTG2 shown excerpted in the drawing also applies for all other line trunk groups with peripheral devices to which PCM time-division multiplexers are connected in the manner indicated. Furthermore provision is made so that, during emergency service the peripheral devices 1DIU1 through 1DIU4 and DIU1 through 2DIU4 of each of these two line trunk groups LTG1 and LTG2 which are connected to the time-division multiplex switching unit Gs1 and/or Gs2 of their own line trunk group LTG1 and/or LTG2, one of the two line trunk groups, for example LTG2, may be switched to a time-division multiplex unit forming a sub-switching matrix, for example GS1, of the respective other line trunk group, for example LTG1. Change-over switches 1d1 through 1d4 and 2d1 through 2d4 are provided for this purpose. These are shown in the state corresponding to normal service in the drawing. Upon a change from normal service to emergency service, they are switched from the state shown into their operating state. The emergency service situation exists when a related failure condition of the kind noted above appears in a line trunk group.

If now, the change-over switches 2d1 through 2d4 are changed from the state shown in the drawing into the operated state during the change from the normal service condition to the emergency service condition, the line units 2DIU1 through 2DIU4 of the line trunk group LTG2 are connected with the time division multiplex switching device GS1 of the line trunk group LTG1 from this time forward. As a result the PCM-transmission systems 2u1 through 2u4, with their individually allocatable channels, can continue to be operated during a failure of the time-division multiplex line L2. Each of these PCM - transmission systems may be individually allocated its own traffic direction. It is also possible to allocate two or more PCM-transmission systems to a traffic route, i.e. they may, in view of the switching system technology, form a common bundle of channel pairs.

As was noted further above, the connections are established via the central switching matrix K1. The central processor ZW1 participates in this action. The line trunk groups, the respective line units they contain, as well as channel pairs carried via these, are selectable in the central processor with the aid of addresses. Provision may now be made for each of the line units to be selected from the central processor with the aid of a normal service address as well as with the aid of an emergency service address. These normal service addresses and emergency service addresses are thus employable according to the respective operational need. Provision is thus made so that the line units which are wired with PCM transmission systems are selectable from the central processor by means respectively of a normal service address and respectively an emergency service address, and that upon the appearance of an operating failure in a line trunk group, for example LTG2 and/or its group control device, for example GP2, which in normal service operation of the same unblocks the emergency service addresses of the appertaining line units, 2DIU1 through 2DIU4 blocked in the central processor and blocks the normal service addresses of these line units instead. In a manner not described in detail, the central processor is thus informed that a line trunk group, for example LTG2, is switching from normal service to emergency service. On the basis of this message the central processor originates the aforementioned procedure of unblocking the emergency service addresses of the appertaining line units as well as the blocking of the normal service addresses of these line units. This also holds in a similar way, for selection addresses of the channel pairs which are carried via the appertaining line units. In this connection provision is also made for the line units, for example 2DIU1 through 2DIU4, to be directly selectable from the central processor by means of the normal service address via their allocated line trunk group, for example LTG2, and by the emergency service address via the respective other line trunk group, for example LTG1.

In the same manner in which the previously described switch-over, of the communication paths, (all channel paths) occurs by means of the change-over switches 2d1 through 2d4, the central clock pulse supply of the appertaining line units is also switched to the respective other line trunk group upon the switch-over from normal service to emergency service. Thus assurance is thereby gained that the line units run time synchronously with the line trunk group to which the respective switch-over has occurred. In the same way the required operating voltages for the appertaining line units may be switched from that line trunk group that has switched over from normal service to emergency service, to the respective other line trunk group. An even greater advantage is gained if the operating voltage supply is designed to have redundancy, i.e. to be fail-safe, for example, being duplicated for all line units of the two line trunk groups.

Deviating in part from what has been described before, it is also possible to arrange for the line units to be selectable by the central processor via the signal channels allocated to the line trunk groups through an address encompassing a first address element designating the respective line trunk group and a second address element within the same, designating the respective line unit. This has already been touched upon. With the aid of the first address element of the address of the appertaining line unit, that line trunk group is respectively selected of which the line unit is a part. The selection of the line trunk group occurs in the manner indicated in that selection setting data is formed in the address signal converter U11/U12 in conjunction with the first address element which is sent to the electronic selector W1 via the control path u, whereby the input-output device G1 is connected via the buffer device MB1 with that signal channel that has been kept in the interconnected state via the switching matrix K1 which leads to the appertaining line trunk group via a time division multiplex line, for example L1/1. Thus, an address signal converter G1 is provided in the central processor which, upon the presentation of data to a line unit provides a signal channel number from the processor based on the data supplied address in conjunction with its first address element, for the selection of the appertaining signal channel. This signal channel number thus designates the previously mentioned signal channel. This signal channel number serves as setting data, which is forwarded over the signal path u1 to the electronic selector noted, for its setting to the appertaining signal channel. This electronic selector may also be developed in any preferred manner as a coupler. The address-signal channel converter G1, in the central processor ZW1, may obviously also be provided as an independent unit (as shown in FIG. 1) but may also be a component of the same. Otherwise it serves in a manner known in the art for the development of the input procedures and output procedures of the central processor ZW1.

As has been explained, in the respective selection of a signal channel for the purpose of selecting the appertaining line trunk group, the indicated address as well as the data is transmitted over this signal channel. Address and data are transmitted via the time-division multiplex switching matrix unit mentioned, for example GS1, then to the appertaining local control unit, for example GP1.

Through the address, and particularly through the second address element contained therein, the latter recognizes which of the line units the respective data is to be forwarded to.

In the previously described context it was pointed out that the address element already mentioned further above designates that line trunk group to which the address and data were transmitted in the manner described. The second address element now indicates which of the line units within the appertaining line trunk group, for example LTG1, is the one to which the appertaining data is to be forwarded. It is to be assumed, that this is the line unit 1DIU2. It is to be further assumed, that the appertaining line trunk group, for example LTG1, finds itself in the normal service state. In this case therefore the change-over switch 1d2 is the resting position shown in FIG. 1. It follows therefore that the line unit 1DIU2 is connected to the time division multiplex switching unit GS1 of the line trunk group LTG1 via the resting position of the change-over switch 1d2.

As previously explained, the local control unit GP1 has, along with the data, also received and stored in the buffer, the address comprising a first address element designating the line trunk group LTG1 and a second address element designating the line unit 1DIU2. Based on the first address element, the local control unit GP1 recognizes that the appertaining data is to be forwarded to a line unit belonging to the same line trunk group LTG1. Based on the second address element, the local control unit GP1 recognizes that the data is to be forwarded to the line unit 1IDU2. On this basis, the local control unit GP1 so controls the time division multiplex switching unit, such that a transmission path interconnects the local control unit GP1 with the line unit 1DIU2 which thus leads over the resting position of the change-over switch 1d2.

Departing from what has been described previously, provision may also be made so that local control unit GP1, in the context indicated, does not also receive the data along with the appertaining address, but only the address itself, add that it establishes a direct transmission path for the data in conjunction with the same, from the signal channel leading over the time division multiplex line L1/1 via the time division multiplex unit GS1 and the resting position of the change-over switch 1d2. Thus in this case, the address is received in the local control unit GP1 via the signal channel and is employed for the establishment of a direct interconnection from the indicated signal channel to the appertaining line unit. Thus in this case the buffering of the appertaining information in the local contract unit GP1 becomes unnecessary.

Still to be explained in this connection, is the special emergency service situation. As has been previously mentioned, an emergency service situation due to a failure may be caused when the signal channel between a line trunk group and the central processor is unusable, or when the local control unit, for example GP2, and/or the time division multiplex switching unit, for example GS1, of the appertaining line trunk group does not exhibit the required functional capability. The central processor has the capability of recognizing this through the continuous execution of a monitoring procedure which is detailed in referenced Journal "telecom report", as well as in the German Patent No. 3 106 903. Should the central processor perceive a service failure which involves the line trunk group, for example LTG2, the entire data exchange between the central processor ZW1 and the line unit 2DIU1 through 2DIU4 from the line trunk group LTG2 affected by the service failure continues via the line trunk group LTG1 for the duration of the service malfunction. To this end, all change-over switches in th respective line trunk group LTG2 are changed over from their rest position to their operating position. This may follow in two ways. Provision may be made so that the service failure within the line trunk group affected by it is itself recognized. This may come about in that the constant monitoring of the total functional capability of each data exchange by the central processor serving the line trunk groups, according to the last mentioned German Patent no longer occurs and that this is perceived within the respective line trunk group. On this basis the mentioned actuation of the change-over switches 2d1 through 2d4 within the appertaining line trunk group can itself be taken up through its local control unit, for example GP2. However, it may also be arranged that central processor ZW1 identifies the respective service failure in the line trunk group LTG2 and that it transmits appropriate data regarding this to the local control unit GP1 of the paired line trunk group LTG1, and that this then transmit a command to the indicated four change-over switches in the line trunk group LTG2 for their actuation.

During the service malfunction affecting the line trunk group LTG2 the change-over switches 2d1 through 2d4 are thus actuated. Accordingly, the line units 2DIU1 through 2DIU4 are connected with the time division multiplex switching unit GS1 of the line trunk group LTG1.

When the central processor ZW1 senses the functional disturbance affecting the respective line trunk group LTG2, it also senses that continuing data exchange with the appertaining line units 2DIU1 through 2DIU2 is to be developed via the signal channel of the line trunk group LTG1, so it also provides corresponding data to the address signal converter U11/U12, in the input-output G1. Through this data, the signal channel number related to the line units 2DIU1 through 2DIU4 in the line trunk group LTG2, is temporarily altered. In practical terms this means that for the duration of the service malfunction of the line trunk group LTG2, upon the selection of one of its line units, the address signal converter upon receiving an address having a first address element designating the line trunk group LTG2 sends control data over the control path u1 to the electronic selector W1 to insure, in this case, that the signal channel of the line trunk group LTG1 rather than the signal channel of the line trunk group LTG2 is selected by the electronic switch W1. The central processor thus provides the address and the data for the selection of an appertaining line unit 2DIU1 through 2DIU2 in the service malfunction state of the line trunk group LTG2 in the same way as in the normal service state of LTG2. For the duration of the service malfunction in the line trunk group LTG2 the address signal channel converter U11/U12 determines that the signal channel of the line trunk group LTG1 is selected rather than its LTG2 signal channel. The re-routing of the data related to the service malfunction of LTG2 for its line units thus occurs in the input-output unit with the aid of the electronic selector W1 as a result of the temporary alteration of signal channel numbers stored in the address signal channel converter U11/U12, which are retrieved from it as control data in each case and forwarded for the control of the selector W1.

If data, together with its associated address, consisting of a first address element and a second address element is now sent to the line trunk group LTG1 as a result of a failure, although the appertaining data is intended for one of the line units 2DIU1 through 2DIU4, the local control unit GP1 senses through the first address element, that the appertaining data is intended for a line unit of the respective other line trunk group. By means of the second address element this local control unit identifies the respective line unit for which the data is intended. On the basis of the first address element and on the basis of the second address element the local control unit GP1 sends the respective data on to that line unit of the other line trunk group LTg2 for which it is intended. For this purpose the local control unit GP1 connects through a transmission path via the time-division multiplex unit GS1 over which the data is then transmitted. This occurs via a corresponding connection of the time division multiplex switching unit GS1 and the actuation side of the appertaining change-over switch, for example 2d2. In this case too, the respective data may be stored in the buffer memory of the local control unit GP1 and then transmitted from there to the appertaining line unit, for example 2DIU2, or provision may be made in the manner described above, so that, in the case described here as well, a direct interconnecting path is formed from the signal channel leading through the time division multiplex line L1/1, through the change-over switch 2d2, in its actuated position, to the line unit DIU2.

Data may be transmitted in the manner described above, from the central processor to each of the line units as well as in the opposite direction. In the latter case data transmitted from the central processor to the appertaining line unit may be a request, on the basis of which the transmitted and requested information is sent from the appertaining line unit to the central processor. Data transmission from line unit to line unit may ensue in the same manner as is described in German Patent No. 3 128 365. Data from a line unit of a line trunk group may thus be transmitted to a line unit of another line trunk group in this manner, whereby these data need not be received by the central processor ZW1 itself, but rather upon arrival in the input-output unit G1 from a line unit, it will be directly transmitted to the appertaining line unit for which it is intended. This is made possible through the forwarding of data within the input-output unit G1 as described in the Patent document last noted.

As is brought out in the preceding part of the description, a central switching matrix K1/K2, serving for the interconnection switching is provided in duplicate. Likewise provided in duplicate is a central processor ZW1/ZW2, whereby the one switching matrix, for example K1 and the one central processor, for example ZW1 are allocated to each other, which also holds for the other switching matrix and the other central processor. Among other functions, the central processor serves in a manner known in the art, for the control of its switching matrix as well as for the processing of the switch identifiers required for the purpose. Each of the two processors is program controlled in a manner known in the art. The duplication of the switching matrix and central processor serves in a known manner for the possibility of stand-by service. For the case of a functional disturbance and/or a switching system failure in one of the two switching matrices and/or in of the two central processors and/or in one of their respective further allocated elements, the known possibility exists, that the switching service instead of continuing with the one central switching matrix, for example K1, and one of the two central processors, for example ZW1, will do so rather with the other of the two switching matrices, for example K2 and with the other of the two central processors, for example ZW2—and oppositely.

As has likewise already been explained—and as is also already known from the referenced section in the literature—a number of local line trunk groups are each equipped with a sub-switching matrix for the external connection of trunk and/or subscriber lines and corresponding channels, and with a local programmable control unit for the reception of switch identifiers from these lines, for switch identifier pre-processing and forwarding to the appertaining central processor and for the transmission of switch identifiers to the noted lines or channels. Thus for example, the line trunk group LTG1 exhibits the sub-switching matrix GS1 and the local control unit GP1. Connected externally to the sub-switching matrix GS1 are the units 1DIU1 through 1DIU4, which have already been mentioned above. Internally the sub-switching matrix is connected to two time-division multiplex lines L1/1 and L1/2, which lead to the two central switching matrices K1 and K2. Each of these time-division multiplex lines encompasses a number, for example thirty, channel pairs, as has likewise been explained above, whereby a respective channel pair contains a transmission channel in the one transmission direction and a transmission channel in the other transmission direction. Each of these channel pairs forms a link line. Consequently, each sub-switching matrix, for example GS1, is connected via two groups of link lines, separated in groups, with switching matrix terminations of the one and of the other of the two parallel switching matrices.

It has likewise already been mentioned—and may also be gathered from the above sections of the literature noted further above—that for a data exchange, serving for the manipulation of switch identifiers, between the local control units on the one hand and the respective service-ready processor on the other, data connections are brought into service ready-state and/or maintained therein. In this switch identifier manipulation therefore, the dial information provided by subscribers as well as the switch identifiers arriving via the already established or partially established communication paths, which arrive over the local line trunk groups are directed to the respective central processor after a pre-processing by the respective local control unit, whereby the former processes setting data for its central switching matrix, as well as switch identifiers and control data, which are again directed to the respective local control unit via the appertaining connections and are transmitted from there, and/or for the connection of call progress tone signal, call signals and the like, for the appertaining subscribers. The data exchange serving for this switch identifier manipulation between each of the local control units on the one hand and the appertaining central processor on the other hand occurs via data connections which are established and continuously maintained in the service-ready state, between each of the local control units via the switching matrix in service and the respective service-ready processor. These data connections are established like message connections via the central switching matrix. They run in the already noted manner via the units MB1 and G1, insofar as the switching matrix K1 and the central processor are in service at the time.

The noted data connections between each of the local control units of each of the line trunk groups on the one hand, and, the respective in-service central processor on the other, serve not only for the executed data exchange for the development of the noted switch identifier manipulation, but these data connections also serve, so that during start-up of a central processor and its allocated central switching matrix, this central processor transmits program and switching software to all local control units of all line trunk groups. This is also known as "Loading" and is described in detail in the already noted Journal "telecom report", Supplement 1981, particularly Page 19ff. Provided for this purpose, in the case of the presently described embodiment, is an input-output unit, for example G1 connected with the central processor, ZW1 for example, to which a number of data buffer memory units, for example MB1 are connected; a number of data connections lead from each of these to the local control units of the line trunk groups noted via the appertaining switching matrix, for example K1. As with the link lines, these data buffer memories are individually directly connected to termination of the switching matrix. As has been brought out, a link line and accordingly also a link circuit is respectively realized through a channel pair. The channel pairs belong to the time division multiplex lines connected to the switching matrix K1 and/or K2.

The technical switching system data required, and to be stored, in the local control unit, as for example, subscriber line status, subscriber call number allocation, subscriber listings and technical characteristics of connected trunk lines and the like, as well as program data which determines the development of the switching system functions, are now entered into corresponding memories of the two central processors and from there are transmitted to and stored in the local control units of the various line trunk groups upon the start-up of a central processor. This transmission and storage occurs individually for each line trunk group, i.e. individually and sequentially for the local control units of the various line trunk groups. The time consumed for this purpose, upon activation of a switching center, is vanishingly small in comparison with that required for the total activities of a switching center. However this consumed time takes on a greater significance in the case of a stand-by service switch-over of the central processor and the central switching matrix. For this case, provision is also made to load the local control units of the line trunk groups with the switching system data and program data, in order to reliably ensure fully synchronous operation between these data, which are thus stored in the central processor newly going into service on the one hand and the local control units on the other hand. By this means, all departures (from synchronism) that might otherwise arise relative to these switching system data and these program data, that are thus stored in the central processor going into service on the one hand and in the local control units of each of the various line trunk groups on the other hand, are excluded. Such departures may, for example, result, if modifications are made over a time interval in these switching system data and/or program data, or as a result of these data in the local control units having been subject to error due to certain disturbing effects. Such departures are however safely excluded through a renewed loading of all local control units with the program and the switching system data in connection with the provided stand-by switch-over of the central processor newly going into service.

Now that the description of the embodiment of the invention, shown in essence in the Figures of a time division multiplex switching system in which the invention is applied has been treated in general terms, it turns to the particular aspects essential to the invention will now be described.

As described above, the switching service is developed with the aid of one of the central processors ZW1 or ZW2 and with the aid of the central switching matrices K1 and/or K2. Accordingly the line trunk groups are also connected with the central switching matrix via time-division-multiplex connecting lines L1/1 and L2/1, and the local control units GP1 and GP2 operate with the central processor ZW1 or the central processor ZW2 in the manner described. The same applies to all other line trunk groups in corresponding way. With the aid of the change-over switches indicated by the symbols LH1 and LH2 in FIG. 2, a corresponding switch-over is implemented whereby the previously mentioned connection of the line trunk groups either with the central switching matrix K1 and the corresponding central processor ZW1 or with the other central switching matrix K2 and the other central processor ZW2 is achieved. The change-over switches LH1 and LH2 are thus shown in a state corresponding to the cooperation of the line trunk groups with the central switching matrix K1 and the central processor ZW1. These change-over switches LH1 and LH2 are found in time-division multiplex termination circuits the significance and operating mode of which are already described in the Journal "telecom report" Supplement 1981, on Page 19 ff as noted further above. These time-division multiplex termination circuits are designated "LIU" and referred to as "link interface" in FIG. 1 on Page 21 of this Journal.

As may be gathered from FIGS. 1 and 2, call data memories (GR1, GR2) are additionally allocated to each of the local control units GP1 and GP2. Stored in these are call data for each interconnected call. They indicate for each call which external sub-switching matrix connection respectively represented on the left side of the sub-switching matrices GS1 and Gs2 in FIG. 2 is respectively connected with its like. Since a time-division multiplex telephone switching system is being dealt with in the present case, these external sub-switching matrix connections are defined through their space slots and through their time slots in a manner understood in the art (space slot-time slot-multiplex). The stored call data per call thus indicates which call-discrete external allocatable connecting path lying at the sub-switching matrix of a line trunk group is connected to which other of its like. This other "like" may lie within the same line trunk group or within another line trunk group. The call data indicate in detail the situation relative to connections within the space-slot-time slot multiplex).

Thus, the significant data regarding which individual call connection at the described telephone switching system is connected with which other connection per call are stored in the manner indicated. This includes all call-discrete connecting paths (subscriber lines, trunk lines, as well as the corresponding call discrete channels). This applies to all trunk line groups.

As likewise explained in detail further above, there is the possibility, in the time-division multiplex telephone switching system described here, that within a pair of trunk line groups, for example LTG1 and LTG1 the line units 1DIU1 through 1DIU4 of a first line trunk group, for example LTG1, which is connected with its own sub-switching matrix, for example GS1 via the non-activated sides of the change over switches, for example 1d1 through 1d4, during normal service, may with the aid of these change-over switches, be switched to the sub-switching matrix, for example GS2 of the respective associated line trunk group, for example LTG2. This applies correspondingly in the reverse order to the line units 2DIU1 through 2DIU4 which can be switched with the aid of the change-over switches 2d1 through 2d4 from the sub-switching matrix GS2 of the same line trunk group LTG2 to the sub-switching matrix GS1 of the line trunk group LTG1.

Through the invention the possibility is now achieved, for such a change-over without interconnected calls having to be interrupted. This can also apply to calls interconnected from subscriber station to subscriber station or additionally also to calls in the establishment stage. Of particular significance however is the interruption-free continuation of calls already interconnected between subscriber to subscriber and via which the respective two subscribers are already communicating (telephone, telex, facsimile, data transmission and the like).

In the context according to the invention, further provision is now made so that when a switch-over is to be implemented in the manner previously mentioned, a switch-over preparation identifier is sent to the appertaining pair of line trunk circuits and respectively sent to one line trunk group therein. This switch-over preparation identifier may for example be sent by the respective central processor. It thus applies respectively to one pair of line trunk groups and relates to one of the two line trunk groups. According to the invention provision is now made so that on the basis of a switch-over preparation identifier sent respectively to one pair of line trunk groups and specifically to one line trunk group, the appertaining two local control units are then blocked for the establishment of new call requests. This blocking action is practicable for only a short period of time in view of its effect on the affected subscribers. Insofar as this blocking affects trunk lines and/or corresponding channels, which are directed via the appertaining two line trunk groups, the effect of the likewise only short term blocking is moreover of minor importance because the appertaining traffic flow can deflect to alternate routes,- in this connection provision may be made so that connections already in the processor of being established may continue to be established, thus are not affect by this blocking. If however, already partially established connections are likewise subjected to this blocking, the only significance of this to the appertaining calling subscriber is that his attempt to establish a call at that moment has not led to a desired result and that he must start a new attempt to establish a call. Of overriding importance in this connection is—as already noted—that calls already interconnected from subscriber station to subscriber station, via which the appertaining subscribers are already communicating are not interrupted.

In the context according to the invention described here, further provision is made so that on the basis of the switch-over preparation identifier provided respectively for one pair of line trunk groups and respectively for one line trunk group therein, the local control unit of that line trunk group, the line units of which are to be switched-over in the manner noted, transmits the call data stored in the call memory of this line trunk group to the local control unit of the other line trunk group. This transmission is carried out by the local control units GP2 and GP1 and in fact via a local data transmission path GL1/2 over which the two local control units GP1 and GP2 are connected. This connection takes place between send and receive units GA1 and GA2 which belong to these local control units. These send and receive units serve for the development of the direct data exchange between the two local control units of one respective pair of line trunk units. On the basis of the switch-over preparation identifier the local control unit GP2 transmits all call data from the call data memory GR2 to the local control GP1. Appropriately, the latter stores the received call data in its own call data memory GR1. This storage may also take place in another corresponding memory.

The local control unit GP1, which has received the call data of those calls via the line units 2DIU1 through 2DIU4 of the line trunk group LTG2 interconnected calls, in this manner, now builds partial connections in conjunction with the appertaining, i.e. its allocated sub-switching matrix, the central switching matrix and the same sub-switching matrix of another sub-switching matrix and to a sub-switching matrix termination that is defined by the respective call data. These partial connections originate at such external sub-switching matrix terminations of the sub-switching matrix GS1 with which the line units of the line trunk group LTG2 are connectable through the switch-over, and lead to sub-switching matrix terminations which are defined by the appertaining call data, and via which the corresponding respective existing subscriber interconnected calls run. Thereby the appertaining partial connections of these calls, to which they individually correspond, are all switched in. Each such separate connection that is established in this manner from an external sub-switching matrix termination originating at the sub-switching matrix GS1 thus corresponds to an existing connection which runs via one of the line units 2DIU1 through 2DIU4. Thereby each partial connection exits from an external sub-switching matrix termination at the sub-switching matrix GS1 which, via the change-over switches 2d1 thorugh 2d4, corresponds to that connecting path that is occupied by the appertaining interconnected call. Thus provision is hereupon made so that each partial connection exits a sub-switching matrix termination which is connectable through the switch-over with that line unit via which the respective originating call is routed, which is maintained in the interconnected state through this partial connection for the avoidance of a call interruption. In this manner the respective interconnected call is transferred to the respective prepared partial connection during the switch-over procedure, and in this manner all calls may be assumed without interruption.

Inasmuch as the two line trunk groups in which a switch-over of one of the two line units of one of the line trunk groups(LTG2) is taken over by the sub-switching matrix (GS1) of the other of the two line trunk groups (LTG1), through which switch-over preparation identifiers are blocked for the establishment of new call requests in the described manner, their local control units GP2 and GP1 are not subject to traffic loading through for the establishment of new call requests during this operating situation but are entirely, or in view of the work load essentially, free for the development of the establishment of the noted partial connections. These partial connections become complete connections through the implementation of the noted switch-over, in that they are drawn into the corresponding connections that had already been interconnected through the switch-over.

What we claim is:

1. A circuit arrangement for centrally controlled telecommunication switching systems, in which a central switching matrix serving for interconnection, together with a program controlled central processor serving, at least, for its control and the required switch identifier processing, and in which a multiplicity of local trunk line groups, each group with a sub-switching matrix for the connection of external trunk and/or subscriber lines, and equipped with a local programmable control unit for the reception of switch identifiers from said lines, for switch identifier pre-processing and for forwarding switch identifiers to the central processor and for the transmission of switch identifiers on said lines is provided, and in which sub-switching matrices within said trunk line groups are internally connected via groups of link lines, separated in groups, with switching terminations of the central switching matrix, and in which the line trunk groups are allocated to each other in pairs, and wherein, line units, primarily connected to their sub-switching matrix and within the respective line trunk group serving for the external connection of subscriber and/or trunk lines, are switchable in a manner in which the line units of respectively a first of these two line trunk groups is additionally switched to the sub-switching matrix of the respective other, whereupon the corresponding switch identifier processing as well as the sub-switching matrix setting for the calls to be interconnected via the switched-over line units is likewise executed by the local control unit of the second line trunk group, characterized in that a call data memory is allocated to each local control unit in which call data is stored per interconnected call, the data regarding which external sub-switching matrix respectively connected with its like within the same line trunk group, or in another line trunk group, that on the basis of a switch-over preparation identifier provided for one line trunk group pair and one line trunk group therein, the appertaining two local control units are blocked against the establishment of new user calls, in particular the calls still in the processor for being established are blocked as well as the local control unit of the first line trunk group that transmits the call data stored in its memory to the control unit of the second line trunk group and that this in conjunction with the call data that is buffered in the call memory of the second line trunk group establishes partial connections via the appertaining sub-switching matrix, the central switching matrix and the same or an another sub-switching matrix, such that these partial connections from such external sub-switching matrix terminations are connectable with those of the first line trunk group through the switch-over.

2. A circuit arrangement according to claim 1, characterized in that each separate connection exits from a sub-switching matrix termination that is connectable, through the switch-over, with that line unit, via which the respective original connection is routed, which is maintained in the interconnected state for the avoidance of an interrupted connection through the separate connection.

* * * * *